Patented Aug. 6, 1940

2,210,439

UNITED STATES PATENT OFFICE 2,210,439

PROCESS FOR COOLING AND DRYING MOIST NITROSYL CHLORIDE GAS

Frank Oscar Agel, Prince George County, Va., assignor to The Solvay Process Company, New York, N. Y., a corporation of New York No Drawing. Application August 11, 1938, Serial No. 224,260

7 Claims. (Cl. 23—157)

This invention is directed to a process for drying a gas containing nitrosyl chloride.

It is known that nitrosyl chloride may be absorbed in cooled concentrated nitric acid. It is also known that nitrosyl chloride reacts with nitric acid, either to form nitric and hydrochloric acids by reaction with the water contained in the nitric acid or to form nitrogen dioxide and chlorine by reaction of the nitrosyl chloride with the $HNO_3$, depending upon the temperature and concentration of the acid.

My invention is directed to a process in which a moist nitrosyl chloride gas is dried by directly contacting the gas with nitric acid under conditions such that nitrosyl chloride remains unabsorbed in the nitric acid and the gas escaping contact with the acid contains nitrosyl chloride and is releatively dry as compared with the initial moist nitrosyl chloride gas.

I have discovered that by directly contacting a moist gas containing nitrosyl chloride with nitric acid containing 50 parts or more $HNO_3$ for every 50 parts $H_2O$ (corresponding to nitric acid of a concentration of 50% $HNO_3$ or higher), refrigerating the acid prior to contact with the gas to a temperature below 10° C., and contacting the acid with the gas to cool the gas to below 15° C. or lower, the gas may be dried until its water content is reduced to a low amount, such as to below 0.1% moisture by weight (both free and combined moisture), without absorbing the major proportion of nitrosyl chloride from the gas or in large degree oxidizing the nitrosyl chloride to nitrogen dioxide and chlorine or reacting it with water contained in an aqueous nitric acid to form nitric and hydrochloric acids.

I have further discovered that by contacting the nitrosyl chloride gas with the refrigerated nitric acid in an apparatus in which the acid and gas are passed countercurrent to each other, the cooling and drying of the nitrosyl chloride gas by means of the nitric acid may be accomplished and the amount of nitrosyl chloride absorbed in and reacted with the aqueous nitric acid particularly minimized while drying the gas to a very low content of residual moisture both free and combined.

In carrying out this invention nitric acid containing 50 parts $HNO_3$ to 50 parts $H_2O$ to 80 parts $HNO_3$ to 20 parts $H_2O$ after being refrigerated to a temperature below 10° C., and preferably to not below —30° C., is introduced to the top of a tower through which the acid passes downwardly in contact with a moist nitrosyl chloride gas containing 10% to 99% NOCl and 0.5% to 75% water vapor by volume introduced into the bottom of the tower at a temperature of 10° C. to 125° C., and passed upwardly therethrough in countercurrent flow and in direct contact with the refrigerated nitric acid to cool the gas. The gas is cooled to a temperature of 15° C. or lower but not to its liquefaction temperature, and preferably not below —25° C. As the acid descending through the tower removes heat from the nitrosyl chloride gas, the temperature of the acid increases to 0° C. to 100° C. The ratio of volumes of gas introduced in contact with the acid to volumes of acid introduced to the top of the tower is maintained within the following limits:

| Temperature, acid from tower | Ratio gas volume to acid volume |
|---|---|
| 0-25° C | From 160 to 2500. |
| 25-50° C | From 80 to 2500. |
| 50-75° C | From 40 to 2500. |
| 75-100° C | From 20 to 2500. |

For the entire range of temperatures of the acid leaving the tower from 0° C. to 100° C. 160 to 2500 volumes of gas may be introduced into contact with every 1 volume of acid.

I have discovered that in cooling and drying a nitrosyl chloride gas by thus contacting it with refrigerated aqueous nitric acid, nitrosyl chloride which is absorbed by the cold acid at the top of the tower is again evolved from the acid in the bottom portion of the tower at the higher temperature reigning therein and the amount of nitrosyl chloride removed as such in solution in the nitric acid flowing from the bottom of the tower is thus minimized. In the bottom portion of the tower, at relatively elevated temperatures of, for example, 50° C. to 100° C. which under some conditions of operation may be attained by the acid, nitrosyl chloride in the incoming moist gas may be in part oxidized by the nitric acid to nitrogen dioxide and chlorine. I have discovered, however, that by having present in the acid introduced to the top of the tower 1 part or more $H_2O$ to every 4 parts $HNO_3$ (corresponding to an 80% or weaker nitric acid), as the gases pass upwardly through the tower in contact with nitric acid at progressively lower temperatures the nitrogen dioxide and chlorine react with water present in the nitric acid to reform nitrosyl chloride and nitric acid. I have found, therefore, that nitrosyl chloride gas may be effectively dried by the aqueous nitric acid without absorbing in the acid more than about 20% of the nitrosyl chloride and while oxidizing less than 10% of the nitrosyl chloride in the gas initially contacted with the acid. Likewise, I have discovered that by operating in the manner described, whereas the low temperature of the acid in the upper portion of the tower favors reaction of nitrosyl chloride with water contained in the nitric acid to form nitric and hydrochloric acids, the more elevated temperatures reigning in the bottom of the tower tend to reverse this reaction of the nitric and hydrochloric acids. Thus, by my preferred procedure of countercurrently contacting the acid and nitrosyl chloride gas, the gas may be dried to a very low content of residual moisture while at the same time the amount of absorbed nitrosyl chloride (both free and combined as HCl) in the nitric acid withdrawn from the bottom of the tower may be minimized.

This preferred procedure may be modified to pass the nitric acid in series through a plurality of vessels through which the nitrosyl chloride gas also is passed in series in a reverse direction to that in which the acid is advanced from one vessel to the next. Instead of flowing the acid from one vessel to the next of the series, the nitrosyl chloride gas may be passed in series through a number of vessels containing the nitric acid in such manner that as the acid becomes heated, the first vessel with respect to the passage of the nitrosyl chloride gas is emptied of acid, recharged with fresh refrigerated acid and is reintroduced into the series as the last vessel with which the gas is contacted. Like the preferred procedure described above employing a tower down which the refrigerated acid flows in countercurrent with the ascending stream of nitrosyl chloride gas, each of these modifications of the preferred procedure involves contacting countercurrently the gas with the previously refrigerated nitric acid, whereby the gas is treated with the acid in a series of stages or zones characterized by progressive drying of the gas and decreasing temperature of the acid, the acid being advanced from one stage or zone to another in which it is contacted with warmer gas containing a larger amount of water than in the stage from which it is advanced.

The following examples are illustrative of this invention:

*Example I.*—60% to 65% nitric acid is refrigerated to a temperature of −10° C. to 0° C. by indirect heat exchange with refrigerated brine. The thus refrigerated acid is introduced to the top of a tower down which the acid flows over packing material serving to intimately contact the acid with a gas passing through the tower. To the bottom of this tower there is introduced a gas substantially consisting of water vapor, nitrosyl chloride and chlorine containing about 20% by volume of water vapor and about equal proportions by volume of nitrosyl chloride and chlorine. The gas entering the bottom of the tower has a temperature of about 75° C. The gas passes upwardly through the tower and is cooled by direct contact with the descending refrigerated nitric acid so that it leaves the top of the tower at a temperature of about 0° C. to 10° C.

By contact with the refrigerated acid the nitrosyl chloride-chlorine gas is cooled and dried until its water content is reduced to about 0.3% by volume, corresponding to about 0.07% moisture by weight. The thus dried gas may then be passed through a cooling coil of which the surfaces exposed to contact with the gas consist of nickel or an alloy of nickel containing about 45% or more nickel to liquefy the nitrosyl chloride and chlorine without undue corrosion of the metal surfaces of the cooling coil.

From the bottom of the tower in which the moist nitrosyl chloride-chlorine gas is contacted with the refrigerated nitric acid a 58% to 63% nitric acid is withdrawn at a temperature of 30° to 50° C. containing dissolved chloride principally in the form of nitrosyl chloride and hydrogen chloride. This acid is mixed with sodium chloride and additional nitric acid and the resulting mixture treated to convert sodium chloride into sodium nitrate and evolve the moist gaseous mixture of nitrosyl chloride and chlorine which is introduced into the bottom of the gas cooling tower to be cooled and dried by direct contact with refrigerated nitric acid in accordance with the procedure of this example. The chloride in solution in the nitric acid leaving the gas cooling tower represents about 10% to 20% of the nitrosyl chloride introduced into the tower and less than 10% of the nitrosyl chloride in the gas initially contacted with the acid is oxidized by the acid.

In carrying out the process of this example with the moist nitrosyl chloride and chlorine gas being passed into the gas cooling tower at the rate of about 500 cubic feet per minute, about 15 to 25 gallons per minute of the refrigerated nitric acid are supplied to the top of the tower. This is equivalent to 1 cubic foot of acid solution to every 150 to 250 cubic feet of the gas.

*Example II.*—The process of Example I may be modified to recycle nitric acid leaving the bottom of the gas cooling tower through a cooler and back into the gas cooling tower at an intermediate point, wherein, mixed with fresh refrigerated acid introduced to the top of the tower, it is again contacted with the moist nitrosyl chloride-chlorine gas passed through this tower.

In thus modifying the procedure of the above example, a 60% to 65% nitric acid cooled to −10° C. to 0° C. is introduced to the top of the gas cooling tower and passed downwardly in contact with the moist nitrosyl chloride-chlorine gas in the proportions of about 1 volume of acid to 600 to 800 volumes of gas introduced to the tower. A solution of chlorides in about 55% to 60% nitric acid is drawn from the bottom of the gas cooling tower. About 80% of this solution containing about 1 mol per liter of chloride (both free chlorine calculated as HCl and combined chlorine present as NOCl and HCl) and about 11 to 12 mols per liter of HNO₃ is passed through a nitric acid cooler in which it is cooled to 20° C. to 30° C. and is then introduced to a mid-portion of the gas cooling tower in the proportion of about 1 volume of the acid for every 150 to 200 volumes of gas introduced to the bottom of this tower. The remainder of the nitric acid flowing from the bottom of the gas cooling tower is mixed with sodium chloride and nitric acid to be reacted to form sodium nitrate and the moist nitrosyl chloride-chlorine gas which is introduced into the bottom of the gas cooling tower. By thus treating the moist gas it is cooled to 0° to 10° C. and its moisture content reduced to below 0.1% by weight.

By constructing the surfaces of the acid cooler with which the nitric acid contacts of a chrome-iron alloy containing about 28% chromium, less than 2% nickel and the remainder principally iron, and by withdrawing the nitric acid from contact with the nitrosyl chloride gas while it has a concentration of 30% to 75% HNO₃ and is at a temperature in the range of about 5° C. to about 75° C. at which the chloride content (both as free and as combined chlorine) of the withdrawn acid is below 2-normal, 25% to 98% of the acid withdrawn from contact with the nitrosyl chloride gas may be recycled into renewed contact with the gas after being cooled to 0° C. to 70° C. and the chrome-iron surfaces of the cooler are suitably resistant to corrosion by the nitric acid containing hydrochloric acid and nitrosyl chloride. An advantage of this mode of carrying out the process of this invention is that it enables one to cool and dry the nitrosyl chloride gas in part by means of recycled acid which is not cooled to as low a temperature as the refrigerated acid initially contacted with the gas. Another advantage is that a given quantity of gas may be cooled to a given temperature and dried by treatment with a smaller quantity of refrigerated acid than when acid leaving contact with the gas is not cooled and recirculated.

In this specification and in the appended claims, when reference is made to the moisture content of a nitrosyl chloride gas, either in terms of its "moisture" or "water vapor" content, it is intended to refer to the total moisture of the gas, both free water and that combined as HNO₃ and HCl. One mol of HCl or HNO₃ is equivalent to one-half mol of free water. Nitrosyl chloride alone or with chlorine reacts with water to form nitric and hydrochloric acids. Nitric acid and hydrochloric acid react to form water, nitrosyl chloride and chlorine. Accordingly, in dealing with moist nitrosyl chloride, with or without chlorine, or nitrosyl chloride containing nitric and hydrochloric acids, these acids are equivalent to water and in this art are considered and referred to as "combined" water or moisture.

I claim:

1. The process for cooling and drying a nitrosyl chloride gas which contains vapors of water, nitric acid and hydrochloric acid, which comprises refrigerating to a temperature below 10° C. an aqueous nitric acid containing 50% to 80% HNO₃, countercurrently contacting said acid with a gas containing 10% to 99% NOCl and 0.5% to 75% of total vapors of H₂O, HNO₃ and HCl, in determining the total quantity of these vapors, the HNO₃ and HCl being calculated as H₂O, one mol of each being equivalent to one-half mol of H₂O, said gas having a temperature of about 10° C. to 125° C. when introduced into contact with said nitric acid, withdrawing said nitric acid from contact with said gas at a temperature of about 0° C. to 100° C., withdrawing the thus dried nitrosyl chloride gas from contact with said nitric acid at a temperature of about 15° C. or lower, and contacting said aqueous nitric acid with said nitrosyl chloride gas in amounts correlated with the temperature at which the acid is withdrawn from contact with the gas in accordance with the following table:

| Temperature of acid withdrawn from contact with the gas | Corresponding ratios of volumes of gas contacted with 1 volume of acid |
| --- | --- |
| 0–25° C | From 160 to 2500. |
| 25–50° C | From 80 to 2500. |
| 50–75° C | From 40 to 2500. |
| 75–100° C | From 20 to 2500. |

2. The process for cooling and drying a nitrosyl chloride gas which contains vapors of water, nitric acid and hydrochloric acid, which comprises refrigerating to a temperature below 10° C. an aqueous nitric acid containing 50% to 80% HNO₃, countercurrently contacting said acid with a gas containing 10% to 99% NOCl and 0.5% to 75% of total vapors of H₂O, HNO₃ and HCl, in determining the total quantity of these vapors, the HNO₃ and HCl being calculated as H₂O, one mol of each being equivalent to one-half mol of H₂O, said gas being contacted with the acid in the proportions of 160 to 2500 volumes of gas to 1 volume of said aqueous nitric acid, said gas having a temperature of about 10° C. to 125° C. when introduced into contact with said nitric acid, withdrawing said nitric acid from contact with said gas at a temperature of about 0° C. to 100° C. and withdrawing the thus dried nitrosyl chloride gas from contact with said nitric acid at a temperature of about 15° C. or lower.

3. The process for cooling and drying a nitrosyl chloride gas which contains vapors of water, nitric acid and hydrochloric acid, which comprises refrigerating to a temperature of −10° C. to 0° C. an aqueous nitric acid containing 60% to 65% HNO₃, countercurrently contacting said acid with a gas substantially consisting of nitrosyl chloride and chlorine in about equal amounts by volume and about 20% by volume of total vapors of H₂O, HNO₃ and HCl, in determining the total quantity of these vapors, the HNO₃ and HCl being calculated as H₂O, one mol of each being equivalent to one-half mol of H₂O, said gas being contacted with the acid in the proportion of about 1 volume of said aqueous acid to 150 to 250 volumes of gas, said gas having a temperature of about 75° C. when introduced into contact with said nitric acid, withdrawing said nitric acid from contact with said gas at a temperature of about 30° C. to 50° C. and withdrawing said gas from contact with said nitric acid at a temperature of about 0° to 10° C.

4. The process for cooling and drying a nitrosyl chloride gas which contains vapors of water, nitric acid and hydrochloric acid which comprises refrigerating a 50% to 80% aqueous nitric acid to a temperature below 10° C., passing the thus refrigerated nitric acid in direct contact with said gas containing nitrosyl chloride and vapors of water, nitric and hydrochloric acids, the gas being initially contacted with the acid at a temperature above 10° C. and so correlating the temperature to which the acid is cooled prior to contact with the gas, the temperature at which the acid is withdrawn from contact with the gas and the concentration and amount of acid introduced into contact with said gas that the gas is cooled to below 10° C. while the total amount of the nitrosyl chloride absorbed in and oxidized by said acid is a minor proportion of the nitrosyl chloride introduced into contact with the acid.

5. The process for cooling and drying a nitrosyl chloride gas which contains vapors of water, nitric acid and hydrochloric acid, which comprises refrigerating a 50% to 80% aqueous nitric acid to a temperature below 10° C., passing the thus refrigerated nitric acid in direct contact with said gas containing nitrosyl chloride and vapors of water, nitric and hydrochloric acids, the gas being initially contacted with the acid at a temperature above 10° C. and so correlating the temperature to which the acid is cooled prior to contact with the gas, the temperature at which the acid is withdrawn from contact with the gas and the concentration and amount of acid introduced into contact with said gas that the gas is cooled to below 10° C. while absorbing no more than about 20% of the nitrosyl chloride in the gas introduced into contact with the acid and oxidizing less than 10% of the nitrosyl chloride in the gas initially contacted with the acid.

6. The process for cooling and drying a nitrosyl chloride gas which contains vapors of water, nitric acid and hydrochloric acid which comprises refrigerating to a temperature below 10° C. an aqueous nitric acid containing 50% to 80% $HNO_3$, countercurrently contacting the thus refrigerated acid with a gas containing 10% to 99% NOCl and 0.5% to 75% of total vapors of $H_2O$, $HNO_3$ and HCl, in determining the total quantity of these vapors, the $HNO_3$ and HCl being calculated as $H_2O$, one mol of each being equivalent to one-half mol of $H_2O$, said gas being contacted with the acid in the proportions of 160 to 2500 volumes of gas to 1 volume of said aqueous nitric acid, said gas having a temperature of about 10° C. to 125° C. when introduced into contact with said nitric acid and withdrawn from contact with said nitric acid at a temperature of about 15° C. or lower, withdrawing from contact with the gas acid of a concentration of 30% to 75% $HNO_3$ at a temperature in the range of about 5° C. to about 75° C. at which the chloride content of the withdrawn acid is below 2-normal, circulating 25% to 98% of the withdrawn acid through an acid cooler of which the surfaces exposed to contact with the acid consist of a chrome-iron alloy containing about 28% chromium, less than 2% nickel and the remainder principally iron and therein cooling the acid to 0° C. to 70° C., and mixing the thus cooled acid with the first mentioned refrigerated acid at an intermediate point between the points of initial and final contact of the refrigerated acid with the nitrosyl chloride gas.

7. The process for cooling and drying a nitrosyl chloride gas which contains vapors of water, nitric acid and hydrochloric acid, which comprises refrigerating to a temperature below 10° C. an aqueous nitric acid containing 50% to 80% $HNO_3$, countercurrently contacting the thus refrigerated acid with a gas containing 10% to 99% NOCl and 0.5% to 75% in the proportions of 160 to 2500 volumes of gas to 1 volume of said aqueous nitric acid, said gas having a temperature of about 10° C. to 125° C. when introduced into contact with said nitric acid and withdrawn from contact with said nitric acid at a temperature of about 15° C. or lower, withdrawing from contact with the gas acid of a concentration of 30% to 75% $HNO_3$ at a temperature in the range of about 0° C. to about 100° C., cooling a portion of the withdrawn acid to 0° C. to 70° C., and mixing the thus cooled acid with the first mentioned refrigerated acid at an intermediate point between the points of initial and final contact of the refrigerated acid with the nitrosyl chloride gas.

FRANK OSCAR AGEL.

CERTIFICATE OF CORRECTION.

Patent No. 2,210,439.  August 6, 1940.

FRANK OSCAR AGEL.

It is hereby certified that error appears in the printed specification of the above numbered patent requiring correction as follows: Page 1, first column, line 27, strike out the word "below"; page 4, second column, line 18, claim 7, after "75%" insert --of total vapors of $H_2O$, $HNO_3$ and $HCl$, in determining the total quantity of these vapors, the $HNO_3$ and $HCl$ being calculated as $H_2O$, one mol of each being equivalent to one-half mol of $H_2O$, said gas being contacted with the acid--; and that the said Letters Patent should be read with this correction therein that the same may conform to the record of the case in the Patent Office.

Signed and sealed this 17th day of September, A. D. 1940.

(Seal)

Henry Van Arsdale,
Acting Commissioner of Patents.